(12) United States Patent
Saito

(10) Patent No.: US 12,397,481 B2
(45) Date of Patent: Aug. 26, 2025

(54) INSERT-MOLDED FILTER AND PRODUCTION METHOD FOR INSERT-MOLDED FILTER

(71) Applicant: NIFCO INC., Yokosuka (JP)

(72) Inventor: Norio Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 422 days.

(21) Appl. No.: 17/801,333

(22) PCT Filed: Feb. 10, 2021

(86) PCT No.: PCT/JP2021/005018
§ 371 (c)(1),
(2) Date: Aug. 22, 2022

(87) PCT Pub. No.: WO2021/172022
PCT Pub. Date: Sep. 2, 2021

(65) Prior Publication Data
US 2023/0081513 A1    Mar. 16, 2023

(30) Foreign Application Priority Data
Feb. 25, 2020 (JP) ................. 2020-029339

(51) Int. Cl.
*B29C 45/14* (2006.01)
*B01D 29/11* (2006.01)
(Continued)

(52) U.S. Cl.
CPC ............ *B29C 45/14* (2013.01); *B01D 29/111* (2013.01); *B01D 29/13* (2013.01); *B29C 45/26* (2013.01);
(Continued)

(58) Field of Classification Search
CPC ......... B29C 45/14; B29C 45/26; B29C 33/12; B01D 29/111; B01D 29/13; B01D 2201/0423; B01D 39/08; B29L 2031/14
(Continued)

(56) References Cited

U.S. PATENT DOCUMENTS

2005/0013344 A1    1/2005  Abdellaoui et al.
2005/0133440 A1*   6/2005  Taniguchi ......... B29C 45/14836
                                                  264/41

FOREIGN PATENT DOCUMENTS

JP    2001-179770 A    7/2001
JP    2005-177639 A    7/2005
(Continued)

OTHER PUBLICATIONS

International Search Report and Written Opinion issued in connection with corresponding PCT Patent Application No. PCT/JP2021/005018 dated Mar. 30, 2021.

*Primary Examiner* — Madeline Gonzalez
(74) *Attorney, Agent, or Firm* — Tarolli, Sundheim, Covell & Tummino LLP

(57) ABSTRACT

This insert-molded filter is obtained by insert-molding a cylindrically-shaped mesh into a resin body. This insert-molded filter is provided with: a body which is equipped with a first annular part, a second annular part, and multiple columnar parts connected to the first and second annular parts, and which has multiple openings formed so as to be separated by the multiple columnar parts between the first and second annular parts; and a mesh which is integrally molded with the body so as to cover the multiple openings separated by the multiple columnar parts. The body is provided with a resin introduction part that is disposed outside of the mesh in the radial direction of the first annular part.

8 Claims, 3 Drawing Sheets

(51) Int. Cl.
  *B01D 29/13* (2006.01)
  *B29C 45/26* (2006.01)
  *B29L 31/14* (2006.01)
(52) U.S. Cl.
  CPC ... *B01D 2201/0423* (2013.01); *B29L 2031/14* (2013.01)
(58) Field of Classification Search
  USPC .......... 210/485, 497.01, 435, 282, 439, 446, 210/465, 470, 471, 481, 495; 264/41
  See application file for complete search history.

(56) References Cited

FOREIGN PATENT DOCUMENTS

| | | |
|---|---|---|
| JP | 2011-148312 A | 8/2011 |
| JP | 2018-069114 A | 5/2018 |

\* cited by examiner

INSERT-MOLDED FILTER AND PRODUCTION METHOD FOR INSERT-MOLDED FILTER

RELATED APPLICATIONS

The present invention is a U.S. National Stage under 35 USC 371 patent application, claiming priority to Serial No. PCT/JP2021/005018, filed on Feb. 10, 2021, which claims priority from Japanese Patent Application No. 2020-029339 filed on Feb. 25, 2020; the entireties of both are hereby incorporated herein by reference.

TECHNICAL FIELD

The present disclosure relates to an insert-molded filter and a method for manufacturing an insert-molded filter.

BACKGROUND ART

Insert molding is used to manufacture a filter for fluid. In one example of insert molding, a mold includes a lower mold that has a cylindrical core pin and an upper mold that has a hole into which the core pin is inserted. Ribs are arranged on the bottom of the hole in the upper mold at equal intervals in the circumferential direction of the core pin. The ribs are inclined relative to the central axis of the core pin.

When performing insert molding with such a mold, a tubular mesh is prepared. The tubular mesh is arranged on the outer surface of the core pin. In this state, the core pin, together with the mesh, is inserted into the hole of the upper mold. The parts of the distal end of the mesh contacting the ribs are moved further toward the central axis of the mesh than the parts of the mesh that do not contact the ribs. As a result, the distal end of the mesh is partially embedded in a body formed by resin injected into the mold. This increases the separation resistance of the mesh from the body compared to when the distal end of the mesh is in contact with the outer surface of the body (refer to, for example, Patent Document 1).

CITATION LIST

Patent Literature

Patent Literature 1: Japanese Laid-Open Patent Publication No. 2018-69114

SUMMARY OF INVENTION

Technical Problem

In the above insert molding, parts of the distal end of the mesh need to contact the ribs to increase the separation resistance of the mesh from the body. The positions of the ribs impose restrictions on the structure of the mold. This, in turn, imposes restrictions on the position of the mesh in the completed filter. Thus, the degree of freedom for the position of the mesh on the filter needs to be increased while ensuring the separation resistance of the mesh from the body.

It is an objective of the present disclosure to provide an insert-molded filter that ensures the separation resistance of a mesh from a body and increases the degree of freedom for the position of the mesh in a filter, and a method for manufacturing the insert-molded filter.

Solution to Problem

According to one aspect of the present disclosure, an insert-molded filter includes a plastic body including a first ring, a second ring, and posts that are connected to the first ring and the second ring, where the body includes openings partitioned by the posts between the first ring and the second ring; and a mesh including a tubular portion, the mesh being molded integrally with the body through insert molding to cover the openings partitioned by the posts. The body includes a plastic inlet portion positioned outward from the mesh in a radial direction of the first ring.

According to another aspect of the present disclosure, a method for manufacturing an insert-molded filter includes preparing an insert-molded mesh including a tubular portion; arranging the insert-molded mesh in a mold; and forcing resin through a gate, located outward from the tubular portion in a radial direction of the tubular portion, into a molding portion of the mold where a body is molded integrally with the insert-molded mesh.

DESCRIPTION OF EMBODIMENTS

An insert-molded filter 10 according to one embodiment will now be described with reference to FIGS. 1 to 6.

Figure 1:
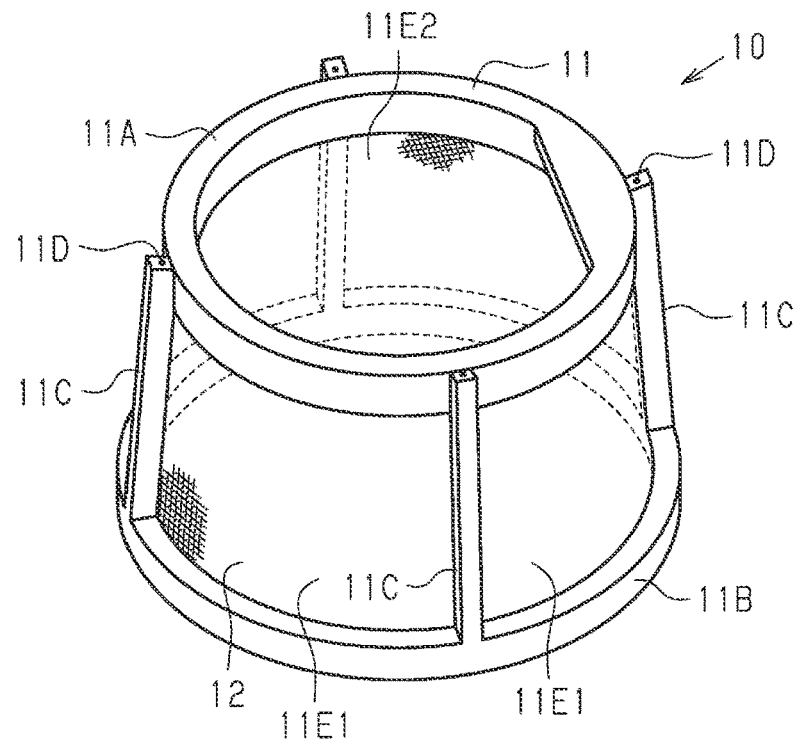
FIG. 1 is a perspective view of an insert-molded filter according to one embodiment.

As shown in FIG. 1, the insert-molded filter 10 includes a body 11 and a mesh 12. The mesh 12 is insert-molded to the plastic body 11 in the insert-molded filter 10 and includes a bottom wall (end wall) 12B and a tubular portion 12A connected to a portion of the bottom wall 12B.

The body 11 includes a first ring 11A, a second ring 11B, and posts 11C. The posts 11C are connected to the first ring 11A and the second ring 11B. The body 11 includes openings 11E1 partitioned by the posts 11C between the first ring 11A and the second ring 11B. The mesh 12 is molded integrally with the body 11 so as to cover an opening 11E2 in the first ring 11A and the openings 11E1 partitioned by the posts 11C. The body 11 includes plastic inlet portions 11D that are positioned outward from the mesh 12 in the radial direction of the first ring 11A.

When manufacturing the insert-molded filter 10, molten resin is drawn through gates, which are located in correspondence with where the inlet portions 11D of the completed insert-molded filter 10 will be located, into portions of the mold where the body 11 is molded. The gates are positioned outward from the mesh 12 in the radial direction of the first ring 11A. Thus, the resin forced through the gates bends the tube end of the mesh 12 inward in the radial direction of the first ring 11A. Consequently, in the completed insert-molded filter 10, at least part of the tube end of the mesh 12 is embedded in the first ring 11A. This ensures the separation resistance of the mesh 12 from the body 11. The positions of the gates do not impose restrictions on the position of the mesh 12 in the insert-molded filter 10. This increases the degree of freedom for the position of the mesh 12 in the insert-molded filter 10.

The inlet portions 11D are located on the posts 11C. This allows the inlet portions 11D, which are located on the posts 11C, to be easily positioned outward from the mesh 12 in the radial direction of the first ring 11A.

The first ring 11A and the second ring 11B are each annular. The diameter of the second ring 11B is greater than the diameter of the first ring 11A. The posts 11C each extend straight from the first ring 11A to the second ring 11B.

Each post 11C has a proximal end that is connected to the second ring 11B and a distal end that is connected to the first ring 11A. In this case, the distal end of the post 11C is connected to the outer surface of the first ring 11A. The proximal end of the post 11C is connected to the surface of the second ring 11B that is opposite to the first ring 11A. The diameter of the second ring 11B is greater than the diameter of the first ring 11A so that the body 11 has a truncated conical form. Thus, the inlet portions 11D, which are located on the posts 11C, are positioned outward from the mesh 12 in the radial direction of the first ring 11A.

The inlet portions 11D are, for example, marks indicating where the gates were located when the insert-molded filter 10 was manufactured. In this case, the inlet portions 11D are gate marks formed by the resin hardened in the gates connected to the molding portion where the body 11 is molded.

Figure 2:
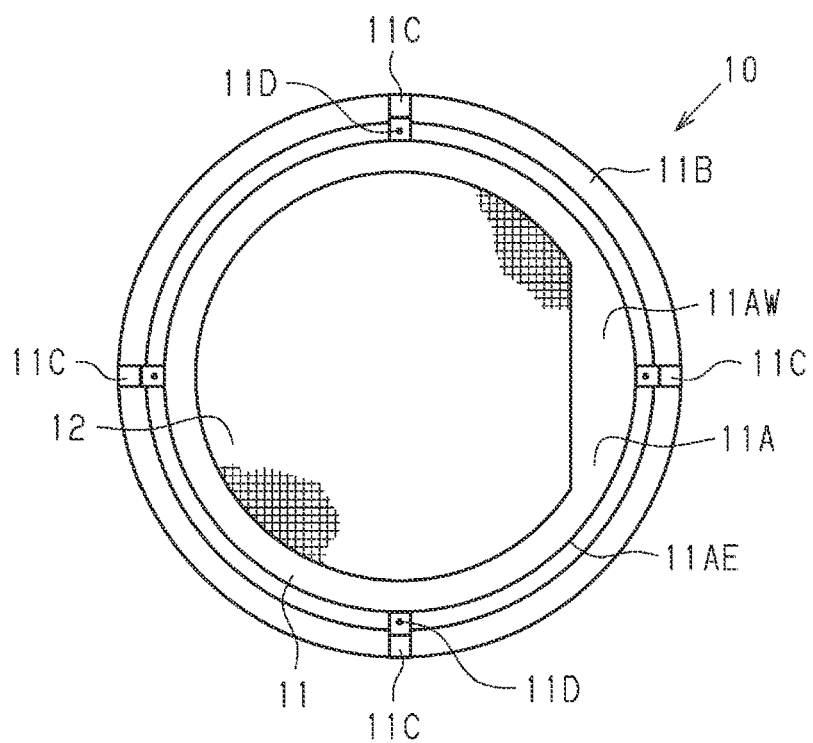
FIG. 2 is a plan view of the insert-molded filter shown in FIG. 1 as viewed from a view point that is opposed to a first ring.

FIG. 2 shows the insert-molded filter 10 as viewed from a view point that is opposed to the opening 11E2 in the first ring 11A.

As shown in FIG. 2, the body 11 includes a plurality of inlet portions 11D. Each inlet portion 11D is one of the plurality of inlet portions 11D. Each inlet portion 11D is located on the corresponding one of the posts 11C. That is, the posts 11C each include one inlet portion 11D. This allows the portion of the tube end of the mesh 12 bent inward in the radial direction of the first ring 11A to be spread in the circumferential direction of the first ring 11A.

In the example shown in FIG. 2, the body 11 includes four posts 11C and the same number of inlet portions 11D. The four posts 11C are arranged at equal intervals in the circumferential direction of the first ring 11A. Thus, the inlet portions 11D are arranged at equal intervals in the circumferential direction of the first ring 11A. In contrast with when the inlet portions 11D are arranged at irregular intervals in the circumferential direction of the first ring 11A, uneven distribution of resin having high energy does not occur at the tube end of the mesh 12 in the circumferential direction of the first ring 11A. Thus, portions in the tube end of the mesh 12 bent inward in the radial direction of the first ring 11A are not concentrated in the circumferential direction of the first ring 11A.

The first ring 11A includes a wide portion 11AW that is wider than other parts of the first ring 11A as viewed from a view point that is opposed to the opening 11E2 of the first ring 11A. The wide portion 11AW is located in a circular area defined by an outer edge 11AE of the first ring 11A. The bottom wall 12B of the mesh 12 is embedded in the wide portion 11AW of the first ring 11A over an amount corresponding to the wide portion 11AW so that the mesh 12 further resists separation from the first ring 11A.

Figure 3:
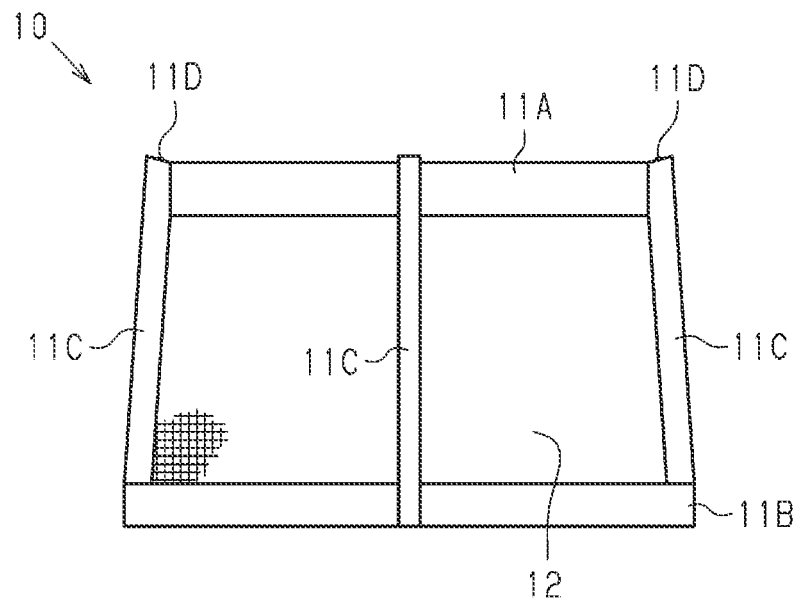
FIG. 3 is a side view shown in the insert-molded filter of FIG. 1 as viewed from a view point that is opposed to one post.

FIG. 3 shows the insert-molded filter 10 as viewed from a view point that is opposed to one of the posts 11C of the body 11.

As shown in FIG. 3, in the direction in which the first ring 11A and the second ring 11B are arranged, the inlet portions 11D are located on the first ring 11A at the side that is opposite to the second ring 11B. Thus, resin forced through the gates having high energy easily reaches the tube end of the mesh 12 and further ensures bending of the tube end of the mesh 12.

When the direction in which the first ring 11A and the second ring 11B are arranged is referred to as the vertical direction and the first ring 11A is located upward from the second ring 11B, the inlet portions 11D are located upward from the first ring 11A. In the example shown in FIG. 3, the inlet portions 11D are located on the distal ends of the arranged posts 11C. Thus, when the insert-molded filter 10 is manufactured, the gates are located upward and radially outward from the tube end of the mesh 12. Thus, the tube end of the mesh 12 is positioned in the passage of resin forced through the gates into the molding portion of the mold, and the tube end of the mesh 12 is supplied with resin having high energy. This bends the tube end of the mesh 12 inward in the radial direction of the first ring 11A.

Figure 4:
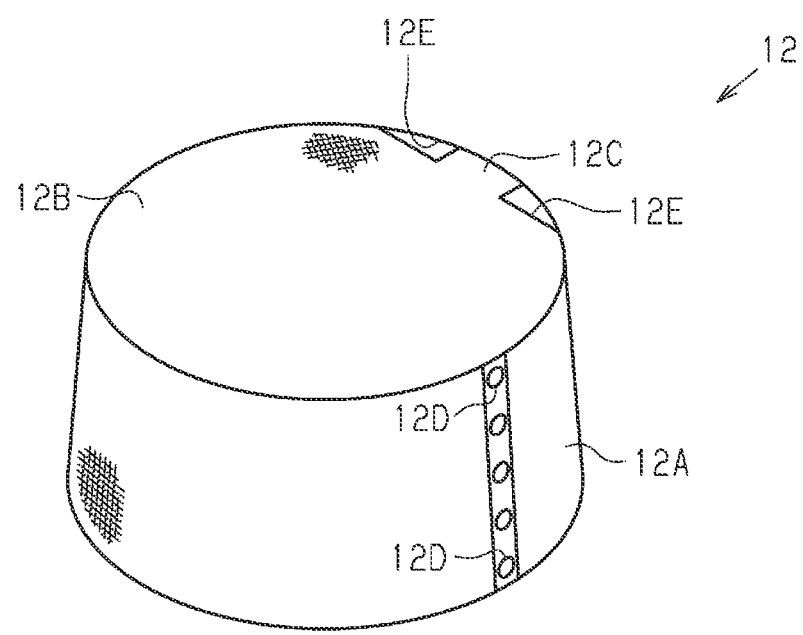
FIG. 4 is a perspective view shown in an insert-molded mesh used to manufacture the insert-molded filter of FIG. 1.

FIG. 4 shows an example of the mesh 12 used to manufacture the insert-molded filter 10.

As shown in FIG. 4, the mesh 12 has a truncated conical form. The mesh 12 includes the tubular portion 12A, the bottom wall 12B, and a connection portion 12C. The tubular portion 12A is shaped when two bonding margins positioned at the two ends of a band-shaped portion are bonded to each other. Welded portions 12D are arranged on the bonding margins in the direction in which the tubular portion 12A extends.

The connection portion 12C connects part of the bottom wall 12B, more specifically, part of the edge of the bottom wall 12B, to the tubular portion 12A. In the tubular portion 12A, only the part of the tube end that is covered by the bottom wall 12B is connected to the bottom wall 12B. Thus, when the insert-molded filter 10 is manufactured, resin is supplied toward the tube end of the tubular portion 12A so that the tube end of the tubular portion 12A is bent inward in the radial direction of the tubular portion 12A.

The tube end of the tubular portion 12A, the bottom wall 12B, and one gap 12E formed by the connection portion 12C are positioned in each of the two sides of the connection portion 12C. The wide portion 11AW of the first ring 11A covers the two gaps 12E.

A method for manufacturing the insert-molded filter 10 includes preparing the insert-molded mesh 12 described above, and arranging the insert-molded mesh 12 in a mold. The method for manufacturing the insert-molded filter 10 further includes forcing resin from the gates, which are located outward from the tubular portion 12A in the radial direction of the tubular portion 12A, into a molding portion of the mold where the body 11 is molded integrally with the mesh 12.

Figure 5:
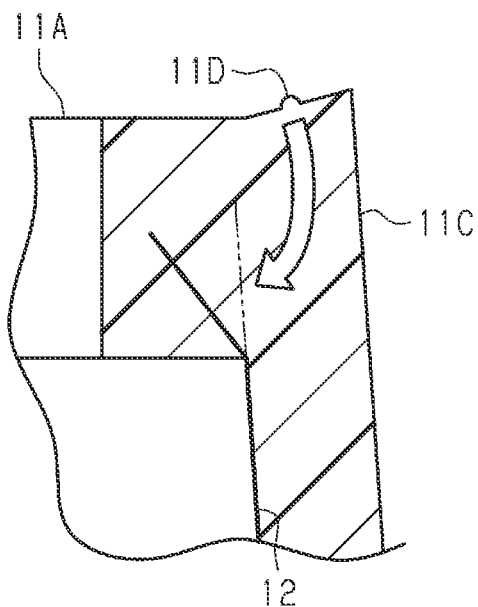
FIG. 5 is a diagram illustrating the operation of an insert-molded filter.

FIG. 5 schematically illustrates the flow of resin when the insert-molded filter 10 is manufactured. To facilitate illustration and description, FIG. 5 shows the flow of resin during manufacturing in a partial cross-sectional view of the completed insert-molded filter 10. FIG. 5 also shows a partial cross-sectional view of one of the posts 11C in the direction in which the posts 11C is extended and a partial cross-sectional view of the mesh 12.

As shown in FIG. 5, resin, forced through the gates corresponding to the inlet portions 11D into the molding portion of the mold, is forced from the outer side of the mesh 12 to the molding portion. This allows the resin forced to the molding portion to flow toward the tube end of the mesh 12. Further, the resin flows from the portions corresponding to the distal ends of the posts 11C toward the tube end of the mesh 12. Thus, in contrast with when the distance is long from the gates to the tube end of the mesh 12, resin having high energy is supplied to the tube end of the mesh 12.

When the mesh 12 is arranged in the mold, the tube end that extends straight in cross section in the direction in which the tubular portion 12A extends as shown by the long-dash double-short-dash line in FIG. 5 is bent inward in the radial direction of the mesh 12 by the resin drawn into the molding portion.

Figure 6:
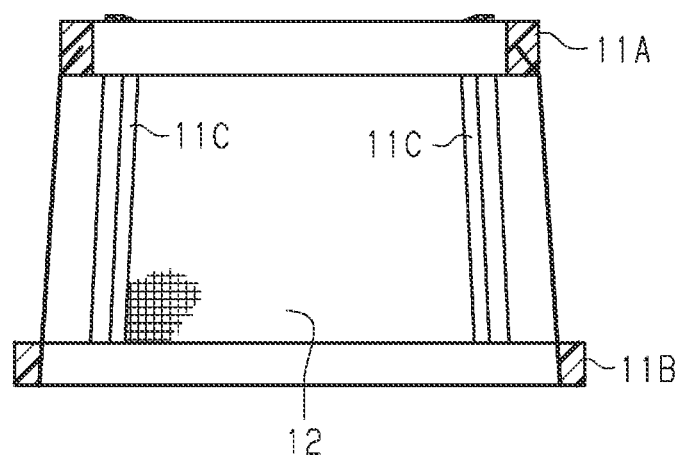
FIG. 6 is a cross-sectional view showing the structure of the insert-molded filter of FIG. 1.

FIG. 6 is a cross-sectional view of the insert-molded filter 10 taken along a plane that includes no posts 11C and is orthogonal to a plane extending across the opening 11E2 in the first ring 11A.

As shown in FIG. 6, the tube end of the mesh 12 is bent inward in the radial direction of the first ring 11A even at positions spaced from the inlet portions 11D in the circumferential direction of the first ring 11A. This increases the separation resistance of the mesh 12 from the body 11.

In the example shown in FIG. 6, among the two tube ends of the mesh 12, the tube end that is in contact with the second ring 11B contacts the inner surface of the second ring 11B. In contrast, the tube end that is in contact with the first ring 11A contacts the outer surface of the first ring 11A if it is not bent inward in the radial direction of the first ring 11A.

When using the insert-molded filter 10, fluid is supplied to the insert-molded filter 10 from the opening in the second ring 11B. Thus, fluid flows from the opening in the second ring 11B toward the openings 11E1 partitioned by the posts 11C. As a result, force acts on the tube end contacting the second ring 11B in the direction pressing the tube end toward the inner surface of the second ring 11B so that the tube end will not separate from the second ring 11B. In contrast, force acts on the tube end contacting the first ring 11A in the direction that separates the tube end from the outer surface of the first ring 11A so that the end tube will easily separate from the first ring 11A. In this respect, with the insert-molded filter 10, the tube end of the mesh 12 contacting the first ring 11A is bent inward in the radial direction of the first ring 11A and embedded in the first ring 11A. This increases the separation resistance of the mesh 12 from the first ring 11A.

As described above, the insert-molded filter according to one embodiment has the following advantages.

(1) Resin forced through the gates bends the tube end of the mesh 12 inward in the radial direction of the first ring 11A so that the tube end of the mesh 12 is at least partially embedded in the first ring 11A. This ensures the separation resistance of the mesh 12 from the body 11.

(2) The positions of the gates do not impose restrictions on the position of the mesh 12 in the insert-molded filter 10. This increases the degree of freedom for the position of the mesh 12 in the insert-molded filter 10.

(3) Resin forced through the gates and having high energy easily reaches the tube end of the mesh 12 and further ensures bending of the tube end of the mesh 12.

(4) The inlet portions 11D are located on the posts 11C and can be easily positioned outward from the mesh 12 in the radial direction of the first ring 11A.

(5) The portion of the tube end of the mesh 12 bent inward in the radial direction of the first ring 11A can be spread in the circumferential direction of the first ring 11A.

(6) The bottom wall 12B of the mesh 12 is embedded in the wide portion 11AW of the first ring 11A over an amount corresponding to the wide portion 11AW so that the mesh 12 further resists separation from the first ring 11A.

The above-described embodiment may be modified as follows.
Bottom Wall
The mesh 12 does not need to include the bottom wall 12B. In other words, the mesh 12 does not need to cover the opening 11E2 in the first ring 11A.
First Ring
The entire first ring 11A may have a width that allows the gaps 12E to be covered. This increases the area of the bottom wall 12B of the mesh 12 that is embedded in the first ring 11A and increases the separation resistance of the mesh 12 from the body 11.
Inlet Portions
The quantity of the inlet portions 11D may be less than the quantity of the posts 11C. In this case, the inlet portions 11D are located on only some of the posts 11C. As described above, each post 11C may include one inlet portion 11D to increase the area in which the tube end of the mesh 12 is bent inward in the radial direction of the first ring 11A.

The body 11 may include only one inlet portion 11D. In this case, when the inlet portion 11D is positioned outward from the mesh 12 in the radial direction of the first ring 11A, advantage (1) is obtained.

The inlet portions 11D do not need to be located on the posts 11C. For example, the body 11 may include a portion connected to the first ring 11A and located outward from the first ring 11A, and the inlet portions 11D may be located at such a portion. In this case, the inlet portions 11D are positioned outward from the mesh 12 in the radial direction of the first ring 11A and obtain advantage (1).

In the direction in which the first ring 11A and the second ring 11B are arranged, the inlet portions 11D may be located on the first ring 11A on the side facing the second ring 11B. In this case, the inlet portions 11D are positioned outward from the mesh 12 in the radial direction of the first ring 11A and obtain advantage (1).

The invention claimed is:

1. An insert-molded filter, comprising:
   a plastic body including a first ring, a second ring, and posts that are connected to the first ring and the second ring, wherein the body includes openings partitioned by the posts between the first ring and the second ring; and
   a mesh including a tubular portion, the mesh being molded integrally with the body through insert molding to cover the openings partitioned by the posts,
   wherein the body includes a plastic inlet portion positioned outward from the mesh in a radial direction of the first ring, and
   wherein in a direction in which the first ring and the second ring are arranged, the inlet portion is located on the first ring at a side that is opposite to the second ring.

2. The insert-molded filter according to claim 1, wherein the inlet portion is located on the post.

3. The insert-molded filter according to claim 1, wherein the inlet portion is one of a plurality of inlet portions, and each of the plurality of inlet portions is located on a corresponding one of the posts.

4. The insert-molded filter according to claim 1, wherein the mesh further includes a bottom wall that covers an opening in the first ring, the first ring includes a wide portion that is wider than other parts of the first ring as viewed from a view point that is opposed to the opening in the first ring, and the wide portion is located in a circular area defined by an outer edge of the first ring.

5. A method for manufacturing an insert-molded filter, the method comprising:

preparing an insert-molded mesh including a tubular portion;

arranging the insert-molded mesh in a mold; and forcing resin through a gate, located outward from the tubular portion in a radial direction of the tubular portion, into a molding portion of the mold where a body is molded integrally with the insert-molded mesh, so that in a direction in which a first ring and a second ring of the body are arranged, an inlet portion of the resin is located on the first ring at a side that is opposite to the second ring.

6. An insert-molded filter, comprising:

a plastic body including a first ring, a second ring, and posts that are connected to the first ring and the second ring, wherein the body includes openings partitioned by the posts between the first ring and the second ring; and a mesh including a tubular portion, the mesh being molded integrally with the body through insert molding to cover the openings partitioned by the posts, wherein the body includes a plastic inlet portion positioned outward from the mesh in a radial direction of the first ring, wherein the mesh further includes a mesh bottom wall that covers an opening in the first ring, wherein the first ring includes a wide portion that is wider than other parts of the first ring as viewed from a view point that is opposed to the opening in the first ring, and wherein the wide portion is located in a circular area defined by an outer edge of the first ring.

7. The insert-molded filter according to claim 6, wherein the inlet portion is located on the post.

8. The insert-molded filter according to claim 6, wherein the inlet portion is one of a plurality of inlet portions, and each of the plurality of inlet portions is located on a corresponding one of the posts.

* * * * *